US008730202B2

United States Patent
Liu et al.

(10) Patent No.: US 8,730,202 B2
(45) Date of Patent: May 20, 2014

(54) TOUCH SENSING APPARATUS AND TOUCH SENSING METHOD THEREOF

(75) Inventors: Tzu-Wei Liu, Hsin-Chu (TW); Hsueh-Ying Huang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 423 days.

(21) Appl. No.: 13/193,792

(22) Filed: Jul. 29, 2011

(65) Prior Publication Data

US 2012/0062508 A1    Mar. 15, 2012

(30) Foreign Application Priority Data

Sep. 15, 2010   (TW) ............................... 99131275 A

(51) Int. Cl.
  *G06F 3/045*   (2006.01)
(52) U.S. Cl.
  USPC ........................................................ 345/174
(58) Field of Classification Search
  USPC ............. 345/156, 173, 174; 178/18.01, 18.06
  See application file for complete search history.

(56) References Cited

U.S. PATENT DOCUMENTS

| | | |
|---|---|---|
| 7,268,337 B2 | 9/2007 | Ozawa |
| 7,692,729 B2 * | 4/2010 | Pak et al. ..................... 349/38 |
| 2009/0058826 A1 | 3/2009 | Lee et al. |
| 2010/0026639 A1 | 2/2010 | Lee et al. |

FOREIGN PATENT DOCUMENTS

| | | |
|---|---|---|
| TW | 200912712 | 3/2009 |
| TW | 200921476 | 5/2009 |

OTHER PUBLICATIONS

Taiwan Patent Office, "Office Action", Sep. 16, 2013.

* cited by examiner

*Primary Examiner* — Rodney Amadiz
(74) *Attorney, Agent, or Firm* — WPAT, PC; Justin King

(57) ABSTRACT

A touch sensing apparatus and a touch sensing method are provided. The touch sensing apparatus includes a plurality of capacitance touch sensors and a post-processing circuit. Each of the capacitance touch sensors determines a value of an output current according to a distance between two electrodes of a touch sensing capacitor thereof. The post-processing circuit performs an integration operation for output currents to obtain a plurality of voltage values. The post-processing circuit further judge whether a touch event occurs according to a voltage difference between two voltage values corresponding to two capacitance touch sensors thereof, to further determine whether calculating a coordinate of a touch position. There is a linear relation between a variation of each of the voltage values and a variation of a distance between the two electrodes of the corresponding touch sensing capacitor.

20 Claims, 16 Drawing Sheets

TOUCH SENSING APPARATUS AND TOUCH SENSING METHOD THEREOF

FIELD OF THE INVENTION

The present invention relates to the touch field and, more particularly, to a touch sensing apparatus and a touch sensing method thereof.

BACKGROUND

Conventional touch sensing apparatus applied in in-cell touch LCD (liquid crystal display) panel is consisted of capacitance touch sensors (will be described later) and a post-processing circuit (will be described later). The capacitance touch sensors are configured for sensing touch operations of users, and the post-processing circuit is configured for determining a touch event according to the signals outputted from the capacitance touch sensors. However, the conventional in-cell touch LCD generally misjudges the touch event, which will be described in following.

FIG. 1 is a schematic view of an equivalent circuit of a conventional capacitance touch sensor and a coupling relation thereof. Referring to FIG. 1, the capacitance touch sensor comprises a transistor 102, a reference capacitor 104, a transistor 106, a touch sensing capacitor 110 and a transistor 112. In addition, a label 108 represents a parasitic capacitor. The capacitance touch sensor is electrically coupled to a gate line 120, a gate line 130, a sensing-signal readout line 140, an initial-voltage supplying line 150 and a common potential COM. The initial-voltage supplying line 150 is electrically coupled to an initial voltage.

In the capacitance touch sensor, the transistor 102 is generally called a reset transistor, the transistor 106 is generally called an amplification transistor, and the transistor 112 is generally called a selecting transistor. In addition, the reference capacitor 104 can be a storage capacitor of a pixel, and the touch sensing capacitor 110 can be a liquid crystal capacitor of the pixel. A capacitance-value of the touch sensing capacitor 110 can be altered with a pressing strength (will be described later).

The capacitance touch sensor may operate in three stages, which are an initial stage, a charging stage and a readout stage in sequence. In the initial stage, the voltage on the gate line 120 is changed from a low potential to a high potential, so that the transistor 102 turns on to pull up the potential at the node A to an initial voltage. Then, in the charging stage, the voltage on the gate line 120 is changed from the high potential to the low potential, so that the transistor 102 turns off and the potential at the node A is shifted to a constant voltage. At the moment, the voltage at the node A can be expressed by the following formula (1):

$$V_a = V_{init} - \frac{C_{ref}}{C_{ref} + C_{lc} + C_p} \times \Delta V \quad (1)$$

Where $V_a$ represents the voltage at the node A, that is the voltage of the gate terminal of the transistor 106. $V_{init}$ represents the initial voltage. $C_{ref}$ represents the capacitance-value of the reference capacitor 104, $C_{lc}$ represents the capacitance-value of the touch sensing capacitor 110, $C_p$ represents the capacitance-value of the parasitic capacitor 108, and $\Delta V$ represents the difference between the high potential and the low potential of the gate line 120.

However, in the readout stage, the voltage on the gate line 130 is changed from the low potential to the high potential, so that the transistor 112 turns on and the capacitance touch sensor can provide a output current to the post-processing circuit (not shown) through the sensing-signal readout line 140. Thus the post-processing circuit can determine whether a touch event occurs according to the output current.

Since the capacitance-value of the touch sensing capacitor 110 is altered with the pressing strength, the voltage $V_a$ is altered therewith to influence the output current of the capacitance touch sensor. Furthermore, since the capacitance-value of the touch sensing capacitor 110 is inversely proportional to the distance between two electrodes thereof (i.e., directly proportional to the pressing strength), from the formula (1), it can be seen that the capacitance-value $C_{lc}$ will not alter and the voltage $V_a$ is constant so that the output current is constant if no touch event occurs. If the touch event occurs, the capacitance-value $C_{lc}$ rises, so that the voltage $V_a$ rises and the output current also rises. Therefore, the post-processing circuit can perform an integration operation on the output current of the capacitance touch sensor to obtain a voltage value and judge whether a touch event occurs according to the voltage value.

FIG. 2 is a cross-sectional view of the in-cell touch LCD panel. In FIG. 2, a label 202 represents a glass substrate at the side of a color filter, a label 204 represents a sensing photo spacer, a label 206 represents a conductive film made of ITO (indium tin oxide), a label 208 represents a liquid crystal capacitor used as the touch sensing capacitor 110, and a label 210 represents another conductive film made of ITO. A label D represents a distance between the conductive film 206 and the conductive film 210, and label D also represents the distance between the two electrodes of the liquid crystal capacitor (i.e., the touch sensing capacitor). A gap between the two electrodes of the touch sensing capacitor will be called a sensing gap in following. In addition, a label 212 represents a storage capacitor used as the reference capacitor 104, a label 214 also represents a conductive film made of ITO, a label 216 represents a metal layer, a label 218 represents another metal layer, and a label 220 represents a glass substrate at the side of an array.

From FIG. 2, it can be seen that if a user presses a location corresponding to the sensing photo spacer 204 (such as a location indicated by an arrowhead 230), the sensing photo spacer 204 is down to decrease the distance between the two electrodes of the liquid crystal capacitor (i.e., the touch sensing capacitor 110). Thus, the capacitance-value of the liquid crystal capacitor is increased.

However, in the manufacturing process of the in-cell touch LCD panel, many factors such as the bend of the glass substrate, the manufacturing error of the array, or the manufacturing error of the color filer will cause non-uniform sensing gaps of capacitance touch sensors arranged in different regions. The following will employ FIG. 3 to describe the above problem in detail. FIG. 3 is a schematic view for describing that the sensing gaps of the capacitance touch sensors are different. As shown in FIG. 3, a sensing gap of a capacitance touch sensor B1 arranged in a bottom right corner of the in-cell touch LCD panel 300 is different from that of a capacitance touch sensor A1 arranged in a top left corner of the in-cell touch LCD panel 300.

In a condition that no touch event occurs, if the sensing gap of the capacitance touch sensor A1 is 0.5 um and it fits with the design standard while the sensing gap of the capacitance touch sensor B1 is 0.4 um, the conventional touch sensing apparatus is prone to misjudge a touch event because of the non-uniform sensing gaps thereof when the in-cell touch LCD panel performs the touch sensing operation.

SUMMARY

The present invention is to provide a touch sensing apparatus, which will not be affected by non-uniform sensing gaps and will not misjudge a touch event.

The present invention is to provide a touch sensing method, which is adapted to the touch sensing apparatus.

The present invention provides a touch sensing apparatus adapted to a LCD panel. The touch sensing apparatus comprises a plurality of capacitance touch sensors and a post-processing circuit. The capacitance touch sensors are disposed in the LCD panel. Each of the capacitance touch sensors has a touch sensing capacitor, and each of the touch sensing capacitors has a first electrode and a second electrode. Each of the capacitance touch sensors determines a value of an output current according to a distance between the first electrode and the second electrode of the touch sensing capacitor thereof. The post-processing circuit is electrically coupled to the capacitance touch sensors for performing an integration operation on the output currents to obtain a plurality of voltage value. The post-processing circuit further determines whether a touch event occurs according to a voltage difference between two voltage values corresponding to a first capacitance touch sensor and a second capacitance touch sensor of the capacitance touch sensors, so as to further determine whether to calculate a coordinate of a touch position. There is a linear relation between a variation of each of the voltage values and a variation of the distance between the first electrode and the second electrode of a corresponding one of the touch sensing capacitors.

The present invention also provides a touch sensing method adapted to a touch sensing apparatus. The touch sensing apparatus comprises a plurality of capacitance touch sensors, and the capacitance touch sensors are disposed in a LCD panel. Each of the capacitance touch sensors has a touch sensing capacitor, and each of touch sensing capacitors has a first electrode and a second electrode. Each of the capacitance touch sensors is configured for determining a value of an output current according to a distance between the first electrode and the second electrode of the touch sensing capacitor thereof. The method comprises the following steps: performing an integration operation on the output currents to obtain a plurality of voltage values; making a linear relation between a variation of each of the voltage values and a variation of the distance between the first electrode and the second electrode of a corresponding touch sensing capacitor of each of the capacitance touch sensors; and determining whether a touch event occurs according to a voltage difference between two voltage values corresponding to a first capacitance touch sensor and a second capacitance touch sensor of the capacitance touch sensors, so as to further determine whether to calculate a coordinate of a touch position.

The present invention makes the linear relation between the variation of each of the voltage values obtained by the post-processing circuit performing the integration operation on the output currents and the variation of the distance (that is the sensing gap) between the first electrode and the second electrode of a corresponding one of the touch sensing capacitors. Since there is the linear relation between the variation of the distance and the variation of the voltage value, the variation of the voltage value is uniform as long as the variation of the corresponding distance is uniform, no matter whether the sensing gap of the capacitance touch sensor fits with the design standard. This means that the variation of each of the voltage values obtained by the post-processing circuit performing the integration operation on the output currents is uniform as long as a user touches the LCD panel with the same force. Therefore, the post-processing circuit will not misjudge a touch event when it determines whether the touch event occurs according to the obtained voltage values. In other words, the touch sensing apparatus will not be affected by non-uniform sensing gaps and will not misjudge a touch event.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Exemplary Embodiment

Figure 4:
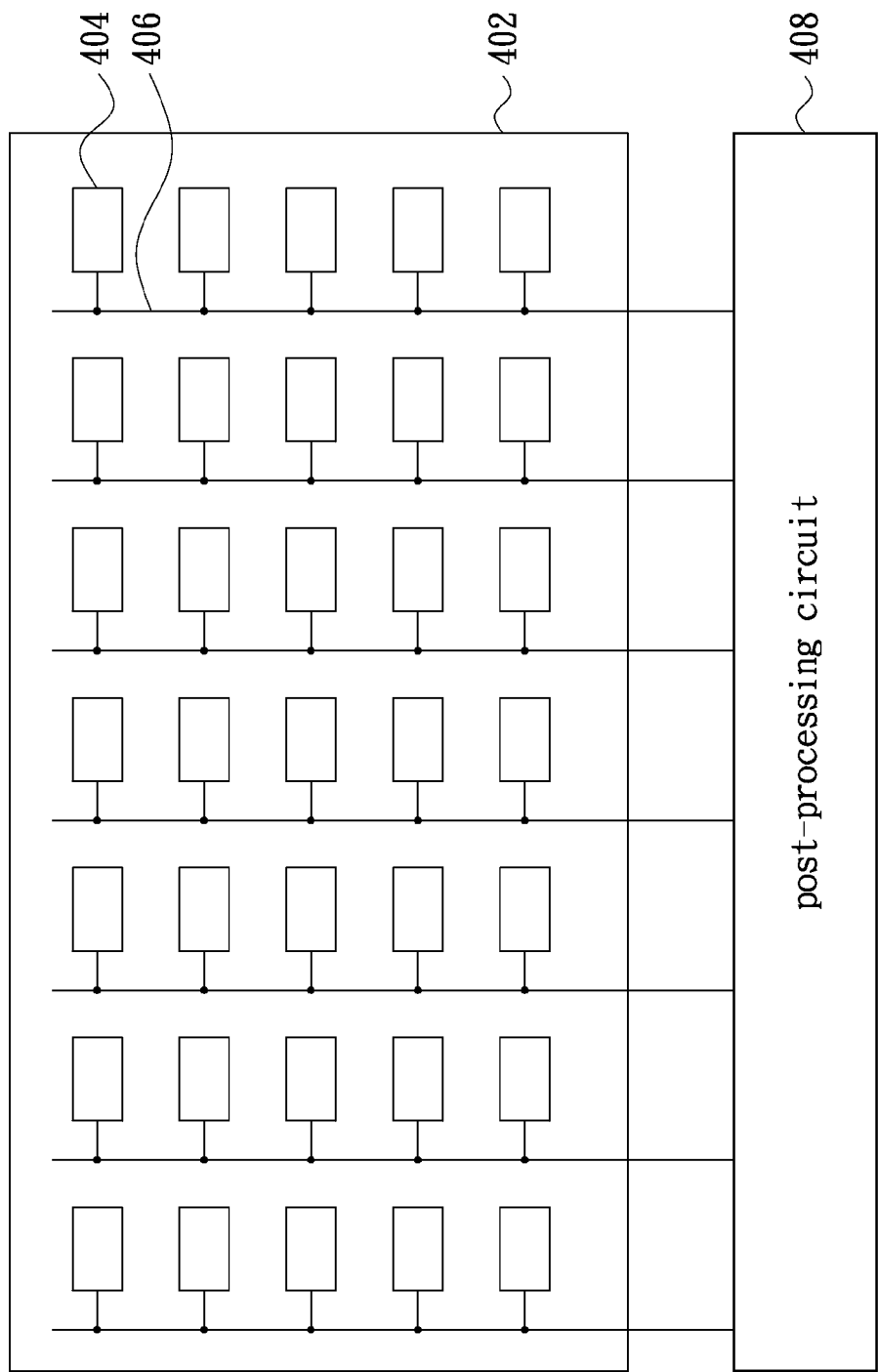
FIG. 4 is a schematic view of an in-cell touch LCD panel employing a touch sensing apparatus of the present invention.

FIG. 4 is a schematic view of an in-cell touch LCD panel employing a touch sensing apparatus of the present invention. As shown in FIG. 4, the in-cell touch LCD panel comprises a LCD panel 402, a plurality of capacitance touch sensors (indicated by a label 404), a plurality of sensing-signal readout line (indicated by a label 406) and a post-processing circuit 408. The touch sensing apparatus of the present invention is substantially consisted of the capacitance touch sensors 404 and the post-processing circuit 408. Each of the capacitance touch sensors 404 is electrically coupled to the post-processing circuit 408 through a corresponding one of the sensing-signal readout lines 406.

The capacitance touch sensors 404 are disposed in the LCD panel 402. Each of the capacitance touch sensors 404 has a touch sensing capacitor (not shown, and it will be described later), and each of the touch sensing capacitors has two electrode. Each of the capacitance touch sensors 404 determines a value of an output current thereof according to a distance (i.e., the sensing gap) between the two electrodes of the touch sensing capacitor thereof. The post-processing circuit 408 is electrically coupled to the capacitance touch sensors 404 to perform integration operations on the output currents outputted from the capacitance touch sensors 404 respectively and to obtain a plurality of voltage values. In addition, the post-processing circuit 408 determines whether a touch event occurs according to a voltage difference between two voltage values corresponding to two of the capacitance touch sensors 404, so as to further determine whether to calculate a coordinate of a touch position. The operation character of the capacitance touch sensors 404 is specifically designed, so that each of the voltage values varies linearly with the distance between the two electrodes of a corresponding one of the capacitance touch sensors 404 (it will be described later).

Figure 5:
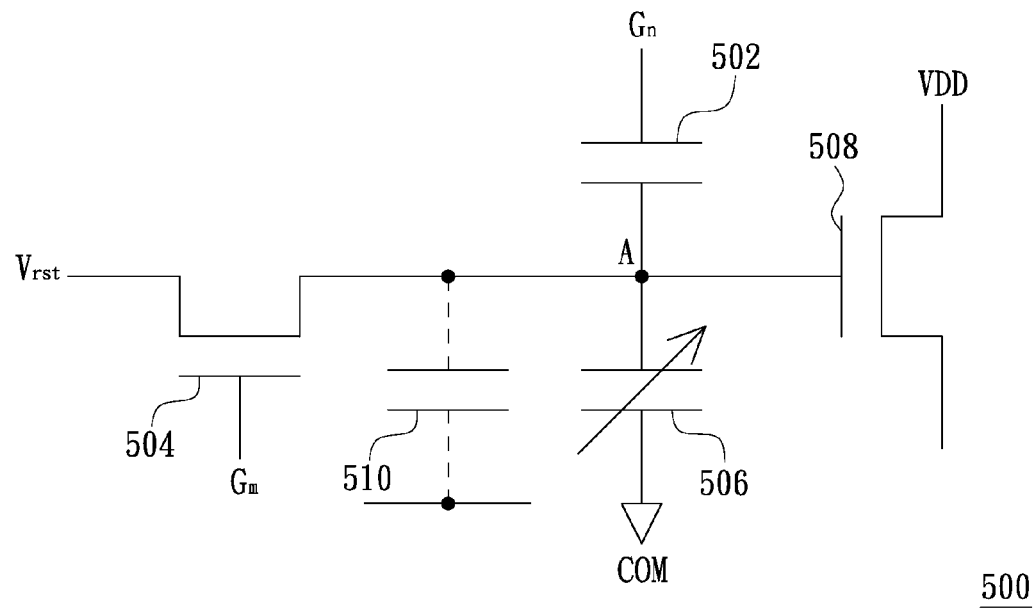
FIG. 5 is a schematic view of a capacitance touch sensor in accordance with an exemplary embodiment of the present invention.

FIG. 5 is a schematic view of a capacitance touch sensor in accordance with an exemplary embodiment of the present invention. Referring to FIG. 5, the capacitance touch sensor 500 comprises a reference capacitor 502, a transistor 504, a touch sensing capacitor 506 and a transistor 508. In addition, a label 510 represents a parasitic capacitor, and a label A represents a node. In the exemplary embodiment, the reference capacitor 502 can be a storage capacitor of a pixel, and the touch sensing capacitor 506 can be a liquid crystal capacitor of the pixel. The capacitance-value of the touch sensing capacitor 506 can be altered with a pressing strength.

Furthermore, a terminal of the reference capacitor 502 is configured for receiving a scanning-pulse signal $G_n$, a source/drain terminal and a gate terminal of the transistor 504 are configured for receiving a reset signal $V_{rst}$ and a scanning-pulse signal $G_m$ respectively, and the voltage of the reset signal $V_{rst}$ is constant. A terminal of the touch sensing capacitor 506 is electrically coupled to a common potential COM, for example the terminal is electrically coupled to a common electrode at the side of a color filter. A source/drain terminal of the transistor 508 is electrically coupled to a power voltage VDD, and the other source/drain terminal thereof is electrically coupled to one of the sensing-signal readout lines 406. A current passing through the two source/drain terminals of the transistor 508 is an output current of the capacitance touch sensor 500. It should be noted that the scanning-pulse signals $G_n$ and $G_m$ can be provided directly by original gate lines (not shown) of the LCD panel 402 or be provided by a specific circuit.

Figure 6:
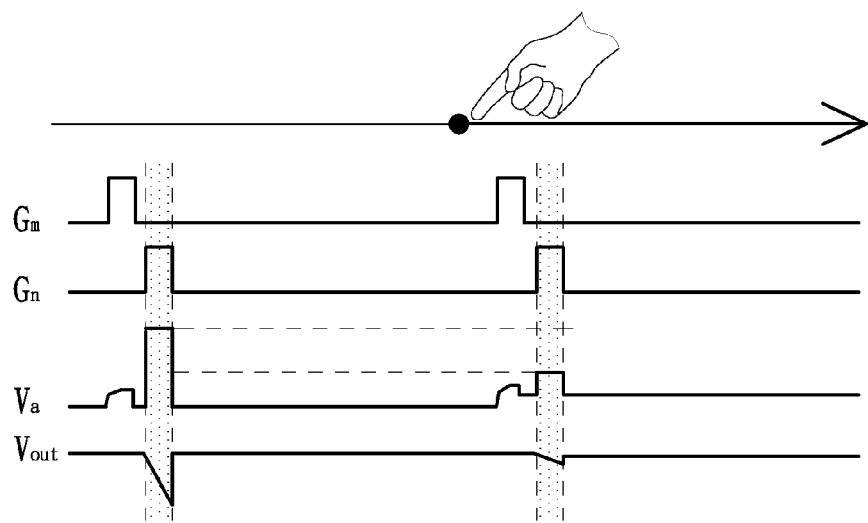
FIG. 6 is a time-sequence view of various signals of a capacitance touch sensor.

FIG. 6 is a time-sequence view of various signals of the capacitance touch sensor. Referring to FIG. 6, labels $G_m$ and $G_n$ represent scanning-pulse signals received by the capacitance touch sensor 500, a label $V_a$ represents the voltage at the node A, and a label $V_{out}$ represents a voltage signal obtained by the post-processing circuit 408 after performing the integration operation on the output current of the capacitance touch sensor 500. From FIG. 6, it can be seen that a predetermined phase difference is between the pulse of the scanning-pulse signal $G_m$ and that of the scanning-pulse signal $G_n$.

From the time-sequence view of the scanning-pulse signals as shown in FIG. 6, it can be seen that the capacitance touch sensor 500 can operate in two stages. A first stage is an initial stage, and the potential at the node A is pulled to the voltage level of the reset signal $V_{rst}$ in the first stage. A second stage is a combination of a charging stage and a readout stage, and the voltage at the node A can be expressed by the following formula (2):

$$V_a = V_{rst} + \frac{C_{ref}}{C_{ref} + C_{lc} + C_p} \times \Delta V \quad (2)$$

Where $V_a$ represents the voltage at the node A, that is the voltage at the gate terminal of the transistor 508. $V_{rst}$ represents the voltage of the reset signal, $C_{ref}$ represents the capacitance-value of the reference capacitor 502, $C_{lc}$ represents the capacitance-value of the touch sensing capacitor 506, $C_p$ represents the capacitance-value of the parasitic capacitor 510, and $\Delta V$ represents the difference between the high potential and the low potential of the scanning-pulse signal $G_n$. From the formula (2), it can be seen that if no touch event occurs, the capacitance value $C_{lc}$ will not alter so that the voltage $V_a$ is constant and the output current is constant. If a touch event occurs, the capacitance value $C_{lc}$ rises so that the voltage $V_a$ falls and the output current also falls.

The following will describe how to get the linear relation by the voltage variation obtained by the post-processing circuit 408 after performing the integration operation on the output current of the capacitance touch sensor 500 and the variation of the distance (i.e., the sensing gap) of the two electrodes of the touch sensing capacitor 506 of the capacitance touch sensor 500.

The exemplary embodiment adjusts the difference between the high potential and the low potential of the scanning-pulse signal $G_n$ and the voltage of the reset signal $V_{rst}$ received by the capacitance touch sensor 500 to obtain the linear relation. Preferably, it may firstly fix the difference between the high potential and the low potential of the scanning-pulse signal $G_n$ and adjust the voltage of the reset signal $V_{rst}$, and then fix the voltage of the reset signal $V_{rst}$ and adjust the difference between the high potential and the low potential of the scanning-pulse signal $G_n$. It will be further described in following.

Figure 7:
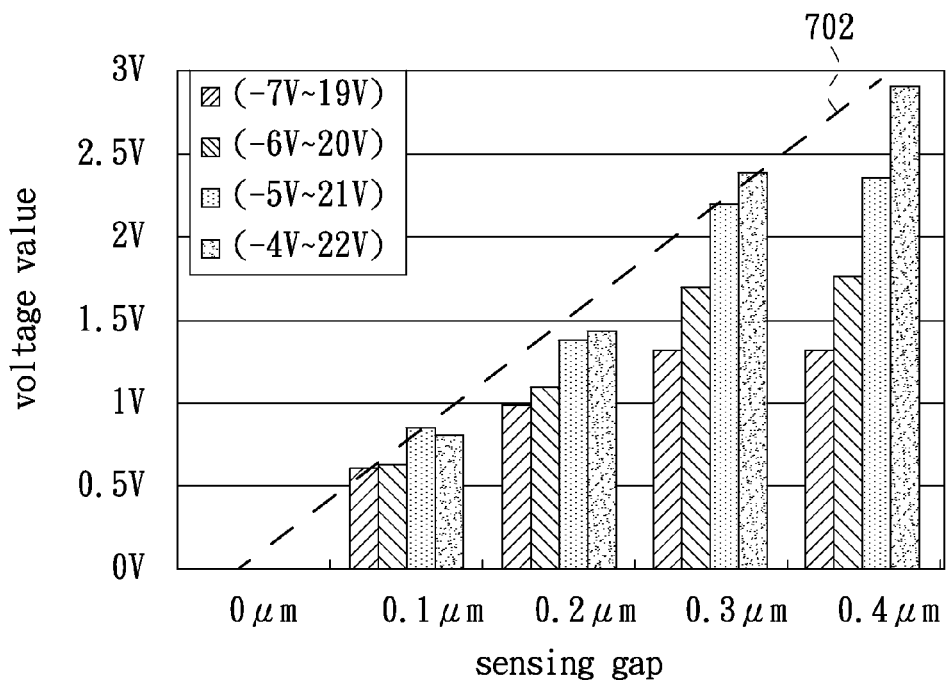
FIG. 7 is a mimic diagram for adjusting a linear relation thereof.

FIG. 7 is a mimic diagram for adjusting the linear relation. In FIG. 7, a vertical axis is configured for representing the voltage value obtained by the post-processing circuit 408 after performing the integration operation on the output current of the capacitance touch sensor 500, and 3V and 0V are an upper limit and a lower limit of the voltage value. A horizontal axis is configured for representing the sensing gap of the capacitance touch sensor (i.e., the distance between the two electrodes of the touch sensing capacitor 506). The labels (−7V∼19V), (−6V∼20V), (−5V∼21V) and (−4V∼22V) represent four conditions of the difference between the high potential and the low potential of the scanning-pulse signal $G_n$ being constant. The labels −7V, −6V, −5V and −4V represent the voltage of the reset signal $V_{rst}$. A dotted line indicated by a label 702 represents an idealization design.

Figure 8:
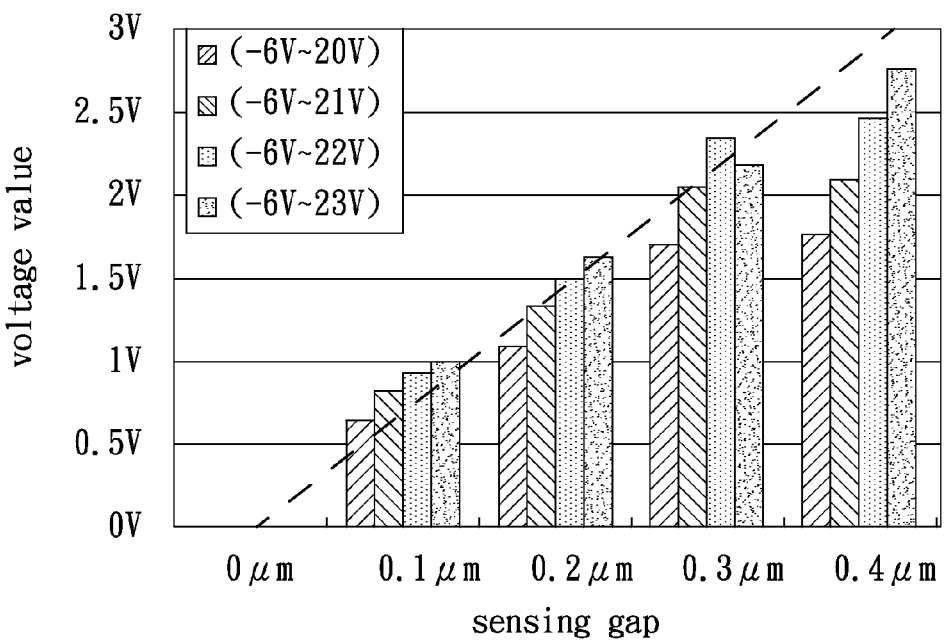
FIG. 8 is another mimic diagram for adjusting a linear relation thereof.

FIG. 8 is another mimic diagram for adjusting the linear relation. FIG. 8 is similar to FIG. 7 except that the difference between the high potential and the low potential of the scanning-pulse signal $G_n$ has four variations, which are (−6V∼20V), (−6V∼21V), (−6V∼22V) and (−6V∼23V) respectively, and the voltage of the reset signal $V_{rst}$ is fixed to −6V. From FIG. 7 and FIG. 8, it can be seen that the linear relation can be obtained by adjusting the difference between the high potential and the low potential of the scanning-pulse signal $G_n$ and the voltage of the reset signal $V_{rst}$.

Figure 9:
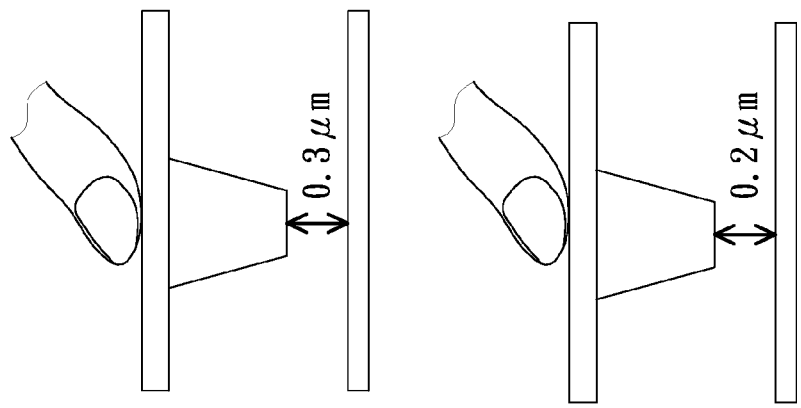
FIG. 9 is a schematic view for describing variations of sensing gaps of capacitance touch sensors in different regions.
Figure 9:
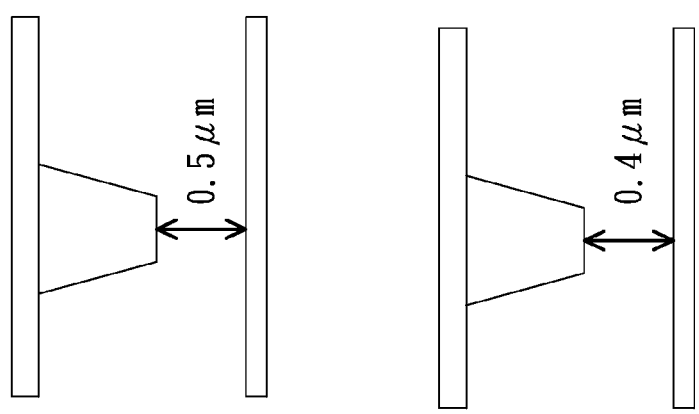
Figure 10:
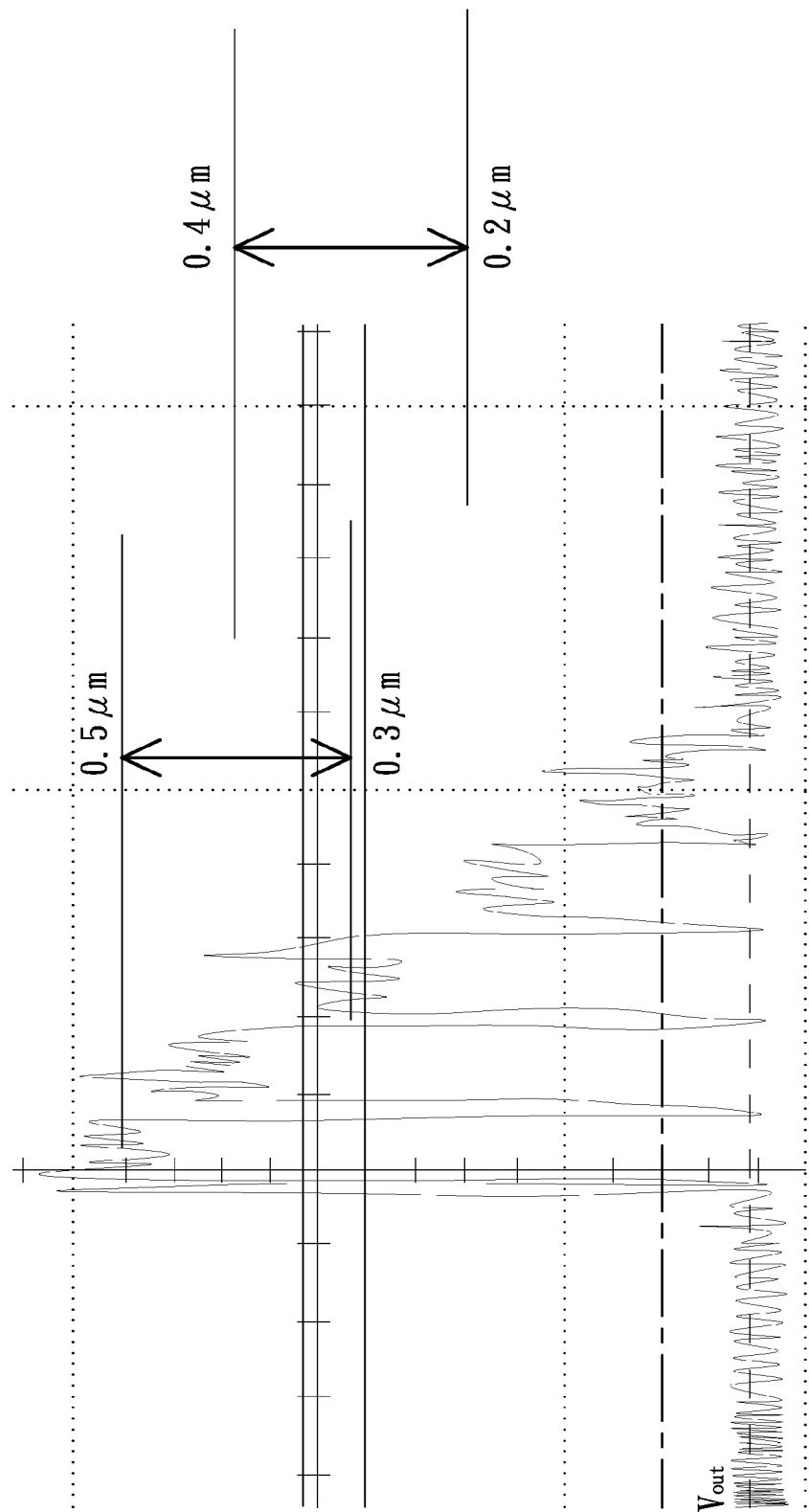
FIG. 10 is a schematic view of a linear relation.

Assuming that no touch event occurs and the sensing gaps of the capacitance touch sensors 404 in different regions of the LCD panel 402 are different, the variations of the non-uniform sensing gaps can be explained by FIG. 9. FIG. 9 is a schematic view for describing the variations of the sensing gaps of the capacitance touch sensors in the different regions. Referring to FIG. 9, the sensing gaps of the capacitance touch sensors in 70 percents of the LCD panel 402 before touching are 0.5 um, and which fit with the design standard, and the sensing gaps in touching are 0.3 um. Furthermore, the sensing gaps of the capacitance touch sensors in 30 percents of the LCD panel 402 before touching are 0.4 um, and the sensing gaps in touching are 0.2 um. Since the variations of the sensing gaps of the capacitance touch sensors 404 in the two regions of the LCD panel 402 are both 0.2 um, and each of the capacitance touch sensors 404 is adjusted by the linear relation, the variations of the sensing gaps of the capacitance touch sensors 404 in the two regions and the variations of the voltage values obtained by the post-processing circuit 408 performing the integration operation on the output currents of the capacitance touch sensors 404 in the two regions will be as shown in FIG. 10. FIG. 10 is a schematic view of the linear relation. In FIG. 10, $V_{out}$ represents the voltage signal obtained by the post-processing circuit 408 performing the integration operation.

From FIG. 10, it can be seen that the variations of the voltage values obtained by the post-processing circuit 408 performing the integration operation is uniform as long as the variations of the corresponding distances is uniform, no matter whether the sensing gaps of the capacitance touch sensors 404 fit with the design standard. That is, the present invention will not be affected by non-uniform sensing gaps and will not misjudge a touch event.

The following will describe how to apply the capacitance touch sensor 500 to the LCD panel 402 and how to employ the capacitance touch sensor 500 to determine a touch event.

Figure 11:
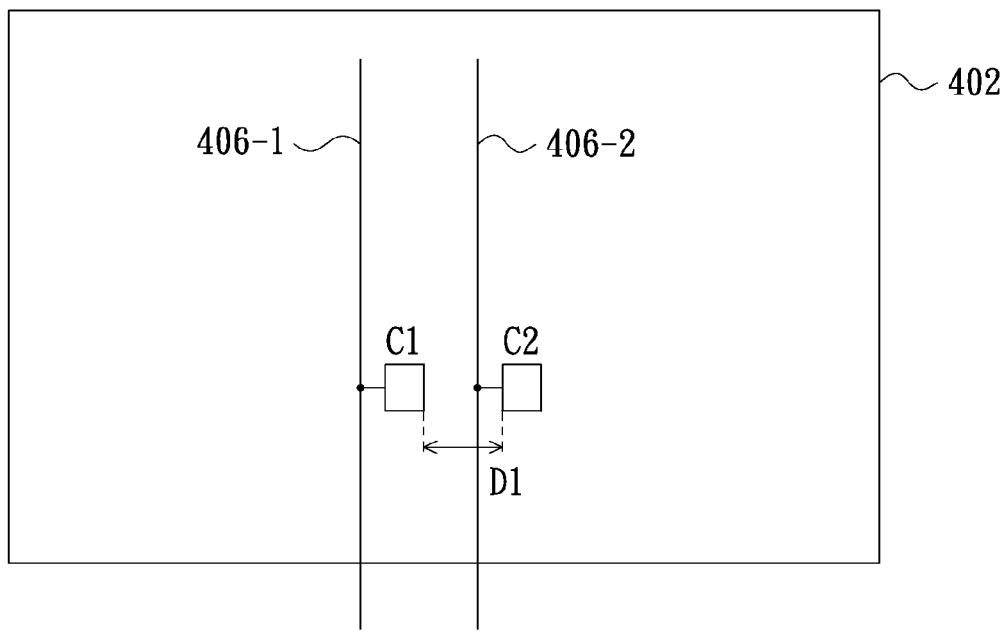
FIG. 11 is a schematic view for disposing capacitance touch sensors of LCD panel.

In the exemplary embodiment, each of the capacitance touch sensors 404 of the LCD panel 402 has the same circuit structure with the capacitance touch sensor 500 described above, and a distance between the capacitance touch sensors 404 in two adjacent columns is larger than a predetermined distance such as a common width of a forefinger, which is as shown in FIG. 11. FIG. 11 is a schematic view for disposing the capacitance touch sensors 404 of the LCD panel 402. In FIG. 11, the label 402 represents the LCD panel, labels C1 and C2 represent two capacitance touch sensors 404 arranged in two adjacent columns and in the same row, a label D1 represents the distance between the capacitance touch sensors C1 and C2, and labels 406-1 and 406-2 represent two sensing-signal readout lines 406.

Referring to FIG. 11, since the distance D1 between the capacitance touch sensors C1 and C2 is larger than the common width of the forefinger, only one of the capacitance touch sensors will be touched by users at the same time. That is, in the two voltage values obtained by the post-processing circuit 408 performing the integration operation on the output currents of the two capacitance touch sensors, only one of the voltage values will fall. Thus, the post-processing circuit 408 can determines whether a touch event occurs according to the voltage difference of the two voltage values corresponding to the two capacitance touch sensors, so as to further determine whether to calculate the coordinate of the touch position. In other words, when the voltage difference of the two voltage values corresponding to the two capacitance touch sensors is larger than a predetermined value, the post-processing circuit 408 will determine that a touch event occurs.

Second Exemplary Embodiment

The exemplary embodiment is similar to the first exemplary embodiment except that in any two columns of the capacitance touch sensors 404 of the LCD panel 402, the capacitance touch sensors 404 in one column are implemented by the capacitance touch sensors 500, and the capacitance touch sensors 404 in the other column are implemented by redundant capacitance touch sensors 500.

The said redundant capacitance touch sensor 500 can be obtained by fixing the distance between the two electrodes of the touch sensing capacitor 506 of the capacitance touch sensors 500. That is, the redundant capacitance touch sensor 500 can be obtained by fixing the sensing gap of the capacitance touch sensor 500. Therefore, the output currents outputted from the redundant capacitance touch sensors 500 are constant no matter whether a user touches the redundant capacitance touch sensors 500. The following will further describe how to determine a touch event in the exemplary embodiment.

Referring to FIG. 11, it assumes that the capacitance touch sensor C1 is implemented by the redundant capacitance touch sensor 500, and the capacitance touch sensor C2 is implemented by the original capacitance touch sensor 500. When the capacitance touch sensor C2 is touched, the post-processing circuit 408 performs the integration operation on the output currents of the two capacitance touch sensors to obtain two voltage values, and only the voltage value corresponding to the capacitance touch sensor C2 falls. Therefore, the post-processing circuit 408 can determine whether a touch event occurs according to the voltage difference of the two voltage values corresponding to the two capacitance touch sensors, so as to further determine whether to calculate the coordinate of the touch position. In other words, when the voltage difference of the two voltage values corresponding to the two capacitance touch sensors is larger than a predetermined value, the post-processing circuit 408 will determines that a touch event occurs.

Third Exemplary Embodiment

The exemplary embodiment is similar to the first exemplary embodiment except that in any two columns of the capacitance touch sensors 404 of the LCD panel 402, the capacitance touch sensors 404 in one column are implemented by the above capacitance touch sensors 500, and the capacitance touch sensors 404 in the other column are implemented by the altered capacitance touch sensors 500. The altered capacitance touch sensor 500 can be obtained by electrically coupling the gate terminal of the transistor 504 of the capacitance touch sensor 500 to an terminal of the reference capacitor 502 configured for receiving the scanning-pulse signal $G_n$ to receive the same scanning-pulse signal. That is, the scanning-pulse signals received by the gate terminal of the transistor 504 and the terminal of the reference capacitor 502 configured for receiving the scanning-pulse signal $G_n$ have the same pulse height and are in phase.

Figure 1:
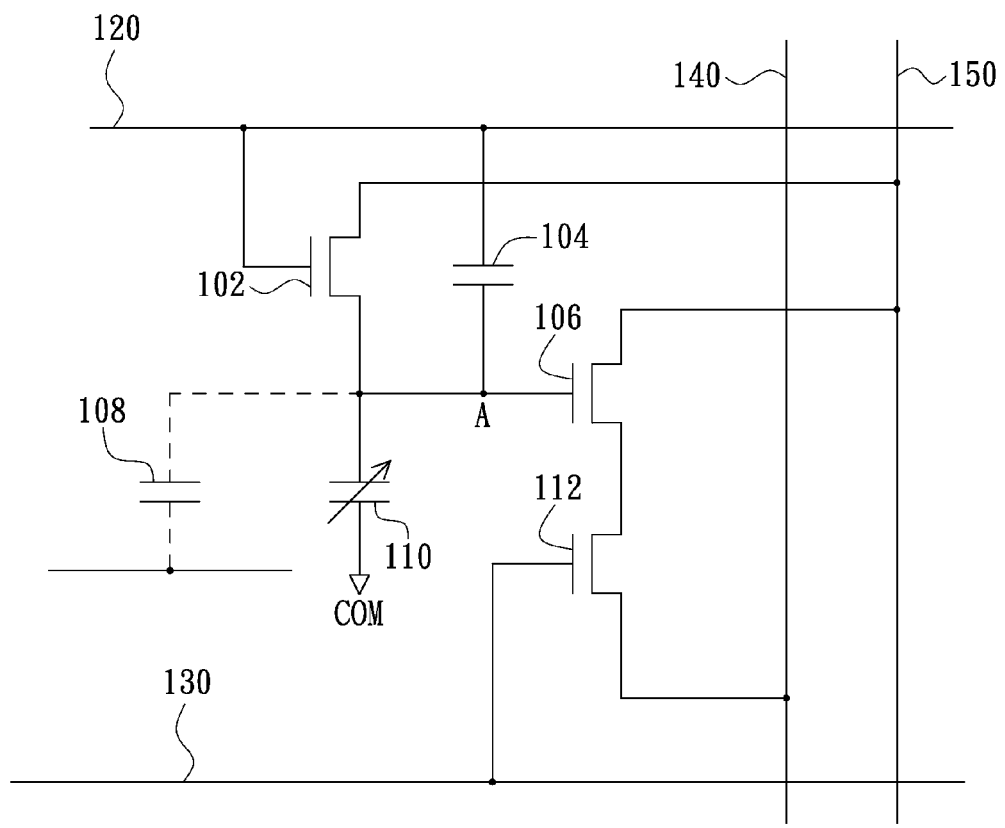
FIG. 1 is a schematic view of an equivalent circuit of a conventional capacitance touch sensor and a coupling relation thereof.
Figure 2:
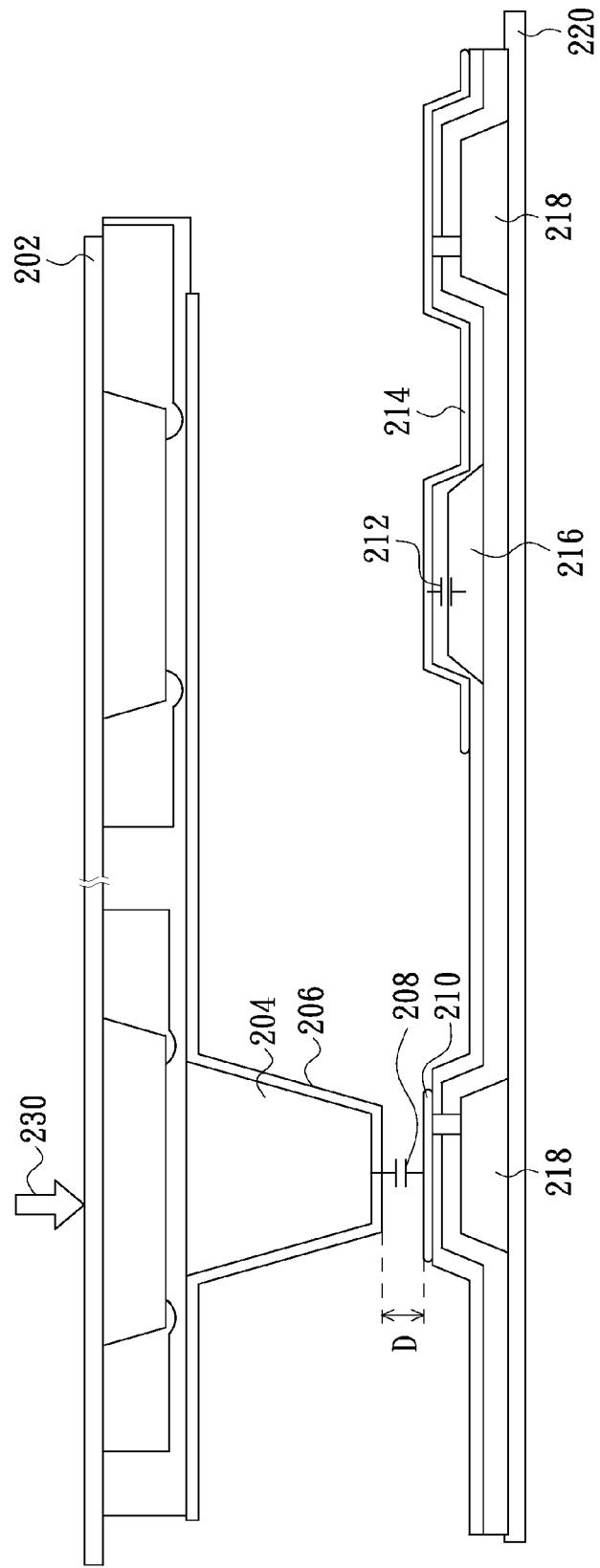
FIG. 2 is a cross-sectional view of an in-cell touch LCD panel.
Figure 3:
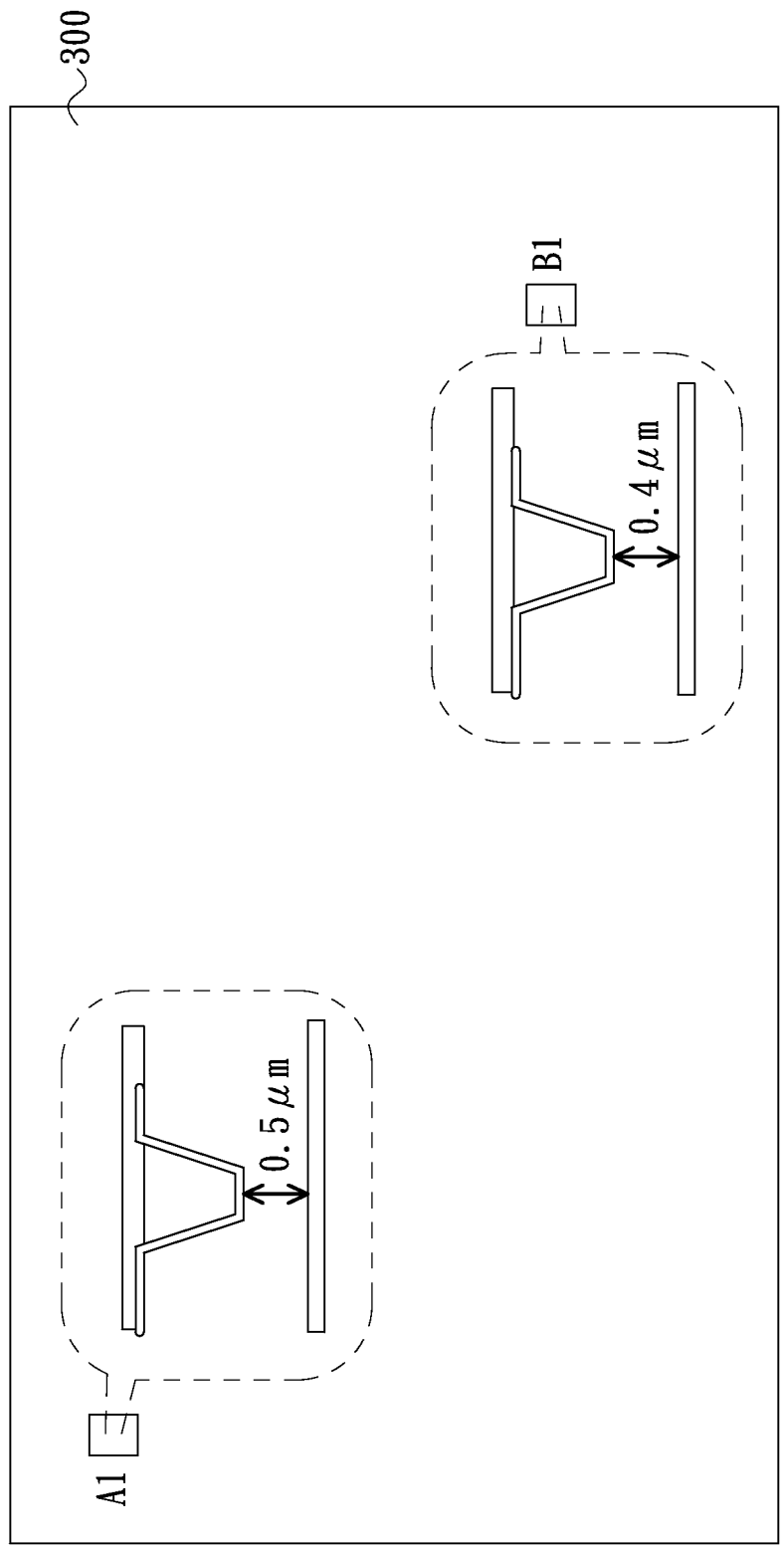
FIG. 3 is a schematic view for describing that the sensing gaps of capacitance touch sensors are different.

For the capacitance touch sensor 500 that the gate terminal of the transistor 504 is not electrically coupled to the terminal of the reference capacitor 502 configured for receiving the scanning-pulse signal $G_n$, when it is touched, the potential at the node A therein falls, which is the same with the character of the circuit as shown in FIG. 5. On the contrary, for the capacitance touch sensor 500 that the gate terminal of the transistor 504 is coupled to the terminal of the reference capacitor 502 configured for receiving the scanning-pulse signal Gn, the coupling modes of the elements therein are similar to those of the elements of the conventional capacitance touch sensor as shown in FIG. 1. Therefore, the potential at the node A therein rises when it is touched, which is the same with the character of the circuit as shown in FIG. 1.

Figure 12:
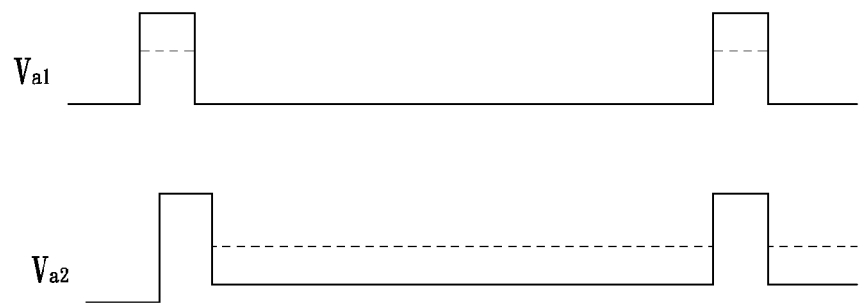
FIG. 12 is a schematic view for describing the voltage variation at the node A of an original capacitance touch sensor and the voltage variation at the node A of an altered capacitance touch sensor.

FIG. 12 is a schematic view for describing the voltage variation at the node A of the original capacitance touch sensor 500 and the voltage variation at the node A of the altered capacitance touch sensor 500. In FIG. 12, a label $V_{a1}$ represents the voltage at the node A of the original capacitance touch sensor 500, and a label $V_{a2}$ represents the voltage at the node A of the altered capacitance touch sensor 500. In addition, a full line represents the voltage before touching, and a dotted line represents the voltage when touching. From FIG. 12, it can be seen that the voltage at the node A of the original capacitance touch sensor 500 falls when touching, and the voltage at the node A of the altered capacitance touch sensor 500 rises when touching.

Figure 13:
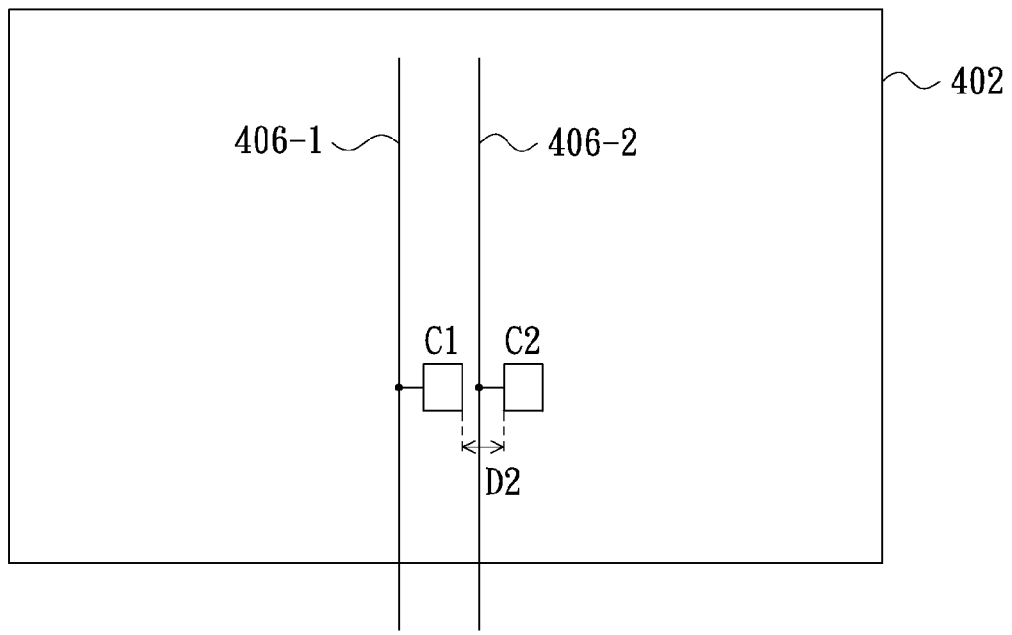
FIG. 13 is a schematic view for disposing capacitance touch sensors of LCD panel.

In addition, the exemplary embodiment is similar to the first exemplary embodiment except that the distance between the capacitance touch sensors 404 in any two columns of the LCD panel 402 is less than a predetermined distance such as the common width of the forefinger as shown in FIG. 13. FIG. 13 is a schematic view for disposing the capacitance touch sensors 404 of the LCD panel 402. In FIG. 13, labels C1 and C2 represent two capacitance touch sensors 404 in two adjacent columns and in the same row. Labels 406-1 and 406-2 represent two sensing-signal readout lines 406, and a label D2 represents a distance between the capacitance touch sensors C1 and C2. The following assumes that the capacitance touch sensor C1 is implemented by the original capacitance touch sensor 500, and the capacitance touch sensor C2 is implemented by the altered capacitance touch sensor 500.

Referring to FIG. 13, since the distance between the capacitance touch sensors C1 and C2 is less than the common width of the forefinger, the two capacitance touch sensors can be touched simultaneously. It means that in the two voltage values obtained by the post-processing circuit 408 performing the integration operation on the output currents of the two capacitance touch sensors at the same time, the voltage value corresponding to the capacitance touch sensor C1 falls, and the voltage value corresponding to the capacitance touch sensor C2 rises. Therefore, the post-processing circuit 408 can determine whether a touch event occurs according to the voltage difference between the two voltage values corresponding to the capacitance touch sensors C1 and C2, which is as shown in FIG. 14.

Figure 14:
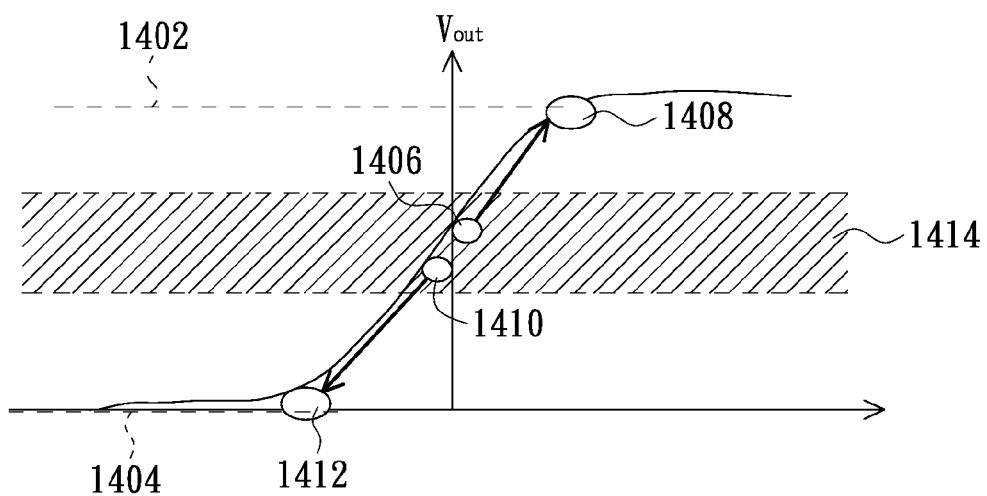
FIG. 14 is a schematic view for determining whether a touch event occurs.

FIG. 14 is a schematic view for determining whether a touch event occurs. In FIG. 14, the vertical axis represents the value of the voltage signal $V_{out}$ obtained by the post-processing circuit 408. In addition, a straight line indicated by a label 1402 represents the upper limit of the voltage signal $V_{out}$, a straight line indicated by a label 1404 represents the lower limit of the voltage signal $V_{out}$, a label 1406 represents the voltage of the capacitance touch sensor C2 before touching, a label 1408 represents the voltage of the capacitance touch sensor C2 when touching, a label 1410 represents the voltage of the capacitance touch sensor C1 before touching, and a label 1412 represents the voltage of the capacitance touch sensor C1 when touching. A region indicated by a label 1414 is called a process window configured for determining whether a touch event occurs. When the voltage difference between the two voltage values corresponding to the capacitance touch sensors C1 and C2 is beyond the range defined by the process window 1414 (i.e., the voltage difference between the two voltage values is larger than the predetermined value), the post-processing circuit 408 will determine that a touch event occurs.

Fourth Exemplary Embodiment

In the exemplary embodiment, all of the capacitance touch sensors 404 of the LCD panel 402 are implemented by the above capacitance touch sensors 500. However, for the capacitance touch sensors 404 arranged in any two columns of the LCD panel 402, the pulse of the scanning-pulse signal $G_n$ received by the capacitance touch sensors 404 arranged in one column and the pulse of the scanning-pulse signal $G_n$ received by the capacitance touch sensors 404 arranged in another column are in anti-phase.

Figure 15:
FIG. 15 is a schematic view for describing a variation at a node A of an original capacitance touch sensor and a voltage variation at a node A of a capacitance touch sensor receiving an inversed scanning-pulse signal Gn.
Figure 15:

FIG. 15 is a schematic view for describing the voltage variation of the node A of the original capacitance touch sensors 500 and the voltage variation of the node A of the capacitance touch sensors 500 receiving the inversed scanning-pulse signal $G_n$. In FIG. 15, a label $V_{a1}$ represents the voltage of the node A of the original capacitance touch sensor 500, and a label $V_{a3}$ represents the voltage of the node A of the capacitance touch sensor 500 receiving the inversed scanning-pulse signal $G_n$. In addition, a full line represents the voltage before touching, and a dotted line represents the voltage when touching. From FIG. 15, it can be seen that the voltage of the node A of the original capacitance touch sensor 500 falls when touching, and the voltage of the node A of the capacitance touch sensor 500 receiving the inversed scanning-pulse signal $G_n$ rises when touching.

In addition, the exemplary embodiment is similar to the first exemplary embodiment except that the distance between the capacitance touch sensors 404 arranged in any two columns of the LCD panel 402 is less than a predetermined distance, such as the common width of the forefinger as shown in FIG. 13. It means that in the two voltage values obtained by the post-processing circuit 408 performing the integration operation on the output currents of the two capacitance touch sensors at the same time, one of the voltage values falls while the other thereof rises. Therefore, the post-processing circuit 408 can determine whether a touch event occurs according to the voltage difference between the two voltage values, which is as shown in FIG. 14.

Fifth Exemplary Embodiment

In the exemplary embodiment, all of the capacitance touch sensors 404 of the LCD panel 402 are implemented by the above capacitance touch sensors 500. However, for the capacitance touch sensors 404 arranged in any two columns of the LCD panel 402, two source/drain terminals of the transistor 508 of each of the capacitance touch sensors 404 arranged in one column are electrically coupled to the power voltage VDD and the post-processing circuit 408 respectively, which is as shown in FIG. 5. And two source/drain terminals of the transistor 508 of each of the capacitance touch sensors 404 arranged in the other column are electrically coupled to a reference potential (such as the common potential COM) and the post-processing circuit 408 respectively.

That is, a source/drain terminal of the transistor 508 of each of the capacitance touch sensors 404 arranged in one column is electrically coupled to the power voltage, and the value of the power voltage is larger than the voltage value at the other source/drain terminal of the transistor 508. In other words, the output currents of the capacitance touch sensors 404 arranged in this column flow from the capacitance touch sensors 404 to the post-processing circuit 408. A source/drain terminal of the transistor 508 of each of the capacitance touch sensors arranged in the other column is electrically coupled to the power voltage, and the value of the power voltage is less than the voltage value at the other source/drain terminal of the transistor 508. In other words, the output currents of the capacitance touch sensors 404 arranged in this column flow from the post-processing circuit 408 to the capacitance touch sensors 404. Certainly, in this exemplary embodiment, the post-processing circuit 408 has the ability for processing the output currents with different flowing directions.

Figure 16:
FIG. 16 is a schematic view for describing a variation at a node A of an original capacitance touch sensor and a voltage variation at a node A of a capacitance touch sensor electrically coupled to a reference potential.
Figure 16:

FIG. 16 is a schematic view for describing the voltage variation of the node A of the original capacitance touch sensor 500 and the voltage variation of the node A of the capacitance touch sensor 500 electrically coupled to the reference potential. In FIG. 16, a label $V_{a1}$ represents the voltage of the node A of the original capacitance touch sensor 500, and a label $V_{a3}$ represents the voltage of the node A of the capacitance touch sensor 500 electrically coupled to the reference potential. In addition, a full line represents the voltage before touching, and a dotted line represents the voltage when touching. From FIG. 16, it can be seen that the voltage of the node A of the original capacitance touch sensor 500 falls when touching, and the voltage of the node A of the capacitance touch sensor 500 electrically coupled to the reference potential also falls when touching.

In addition, the exemplary embodiment is similar to the first exemplary embodiment except that the distance between the capacitance touch sensors 404 arranged in any two columns of the LCD panel 402 is less than a predetermined distance, such as the common width of the forefinger as shown in FIG. 13. It means that in the two voltage values obtained by the post-processing circuit 408 performing the integration operation on the output currents of the two capacitance touch sensors at the same time, both of the two voltage values falls. Therefore, the post-processing circuit 408 can determine whether a touch event occurs according to the voltage difference between the two voltage values, which is as shown in FIG. 17.

Figure 17:
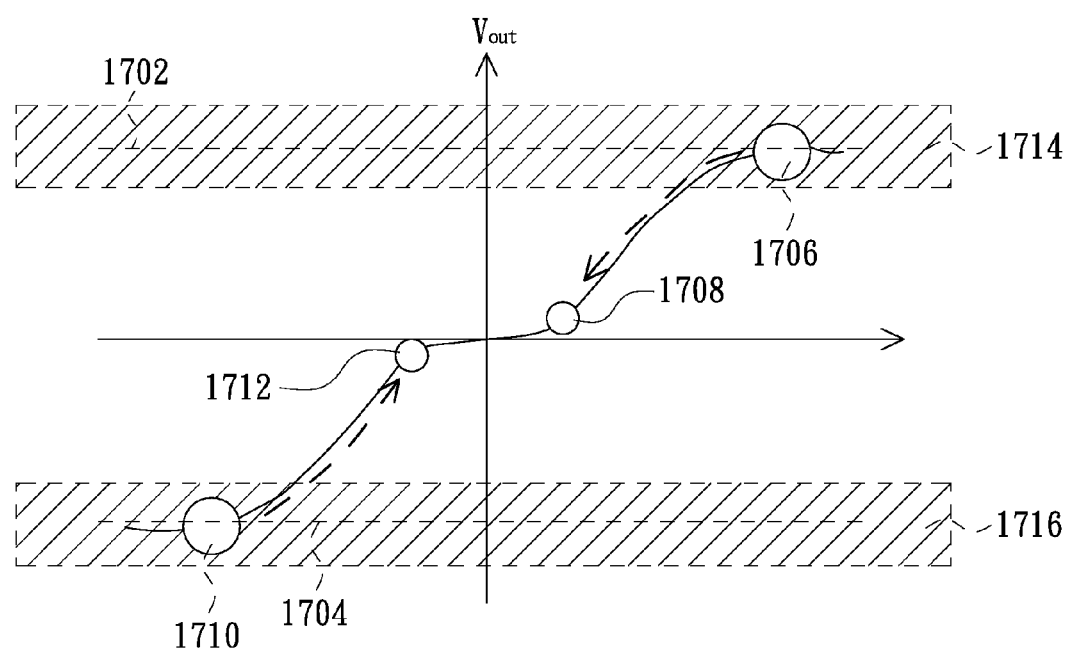
FIG. 17 is a schematic view for determining whether a touch event occurs.

FIG. 17 is a schematic view for determining whether a touch event occurs. In FIG. 17, the vertical axis represents the value of the voltage signal $V_{out}$ obtained by the post-processing circuit 408. In addition, a straight line indicated by a label 1702 represents the upper limit of the voltage signal $V_{out}$, a straight line indicated by a label 1704 represents the lower limit of the voltage signal $V_{out}$, a label 1706 represents the voltage value of the original capacitance touch sensor 500 before touching, a label 1708 represents the voltage of the original capacitance touch sensor 500 when touching, a label 1710 represents the voltage of the capacitance touch sensor 500 electrically coupled to the reference potential before touching, and a label 1712 represents the voltage of the capacitance touch sensor electrically coupled to the reference potential when touching. Regions indicated by labels 1714 and 1716 are both process windows configured for determining whether a touch event occurs.

When the voltage difference between the two voltage values corresponding to the original capacitance touch sensor and the capacitance touch sensor electrically coupled to the reference potential is beyond the ranges defined by the process windows 1714 and 1716 (i.e., the voltage difference of the two voltage values is less than a predetermined value), the post-processing circuit will determine that a touch event occurs.

The following will illustrate other circuit architectures of the capacitance touch sensor 404.

Figure 18:
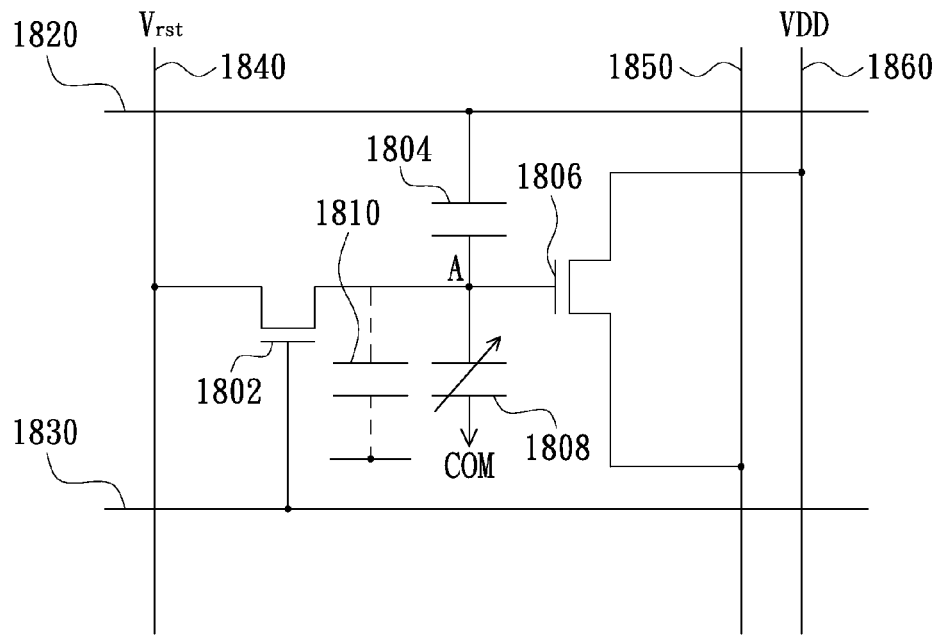
FIG. 18 is a schematic view of an equivalent circuit of a capacitance touch sensor and a coupling relation thereof in accordance with another exemplary embodiment of the present invention.

FIG. 18 is a schematic view of an equivalent circuit of the capacitance touch sensor and a coupling relation thereof in accordance with another exemplary embodiment of the present invention. Referring to FIG. 18, the capacitance touch sensor consists of a transistor 1802, a reference capacitor 1804, a transistor 1806 and a touch sensing capacitor 1808. In addition, a label 1810 represents a parasitic capacitor. The capacitance touch sensor is electrically coupled to a gate line 1820, a gate line 1830, a reset-signal supplying line 1840, a sensing-signal readout line 1850, a power-voltage supplying line 1860 and a common potential COM. The reset-signal supplying line 1840 is electrically coupled to a reset signal $V_{rst}$, and the power-voltage supplying line 1860 is electrically coupled to a power voltage VDD. In the capacitance touch sensor, the transistor 1802 is called a reset transistor, and the transistor 1806 is called an amplification transistor. In addition, the capacitance-value of the touch sensing capacitor 1808 alters with the pressing strength, and the current passing through the two source/drain terminals of the transistor 1806 is the output current.

Figure 19:
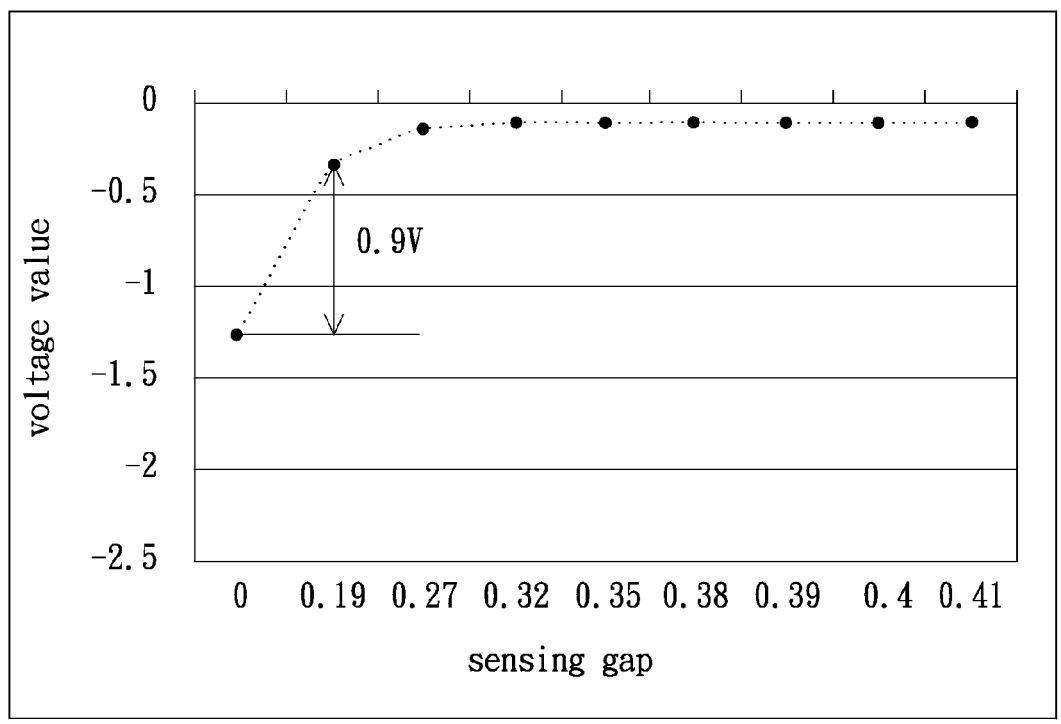
FIG. 19 is a schematic view of a linear relation of the circuit as shown in FIG. 18.

FIG. 19 is a schematic view of a linear relation of the circuit as shown in FIG. 18. In FIG. 19, the vertical axis represents the voltage value of the post-processing circuit 408 performing the integration operation on the output current of the capacitance touch sensor as shown in FIG. 18, and the unit of the voltage value is V. The horizontal axis represents the sensing gap of the capacitance touch sensor (i.e., the distance between the two electrodes of the touch sensing capacitor), and the unit of the sensing gap is um.

Figure 20:
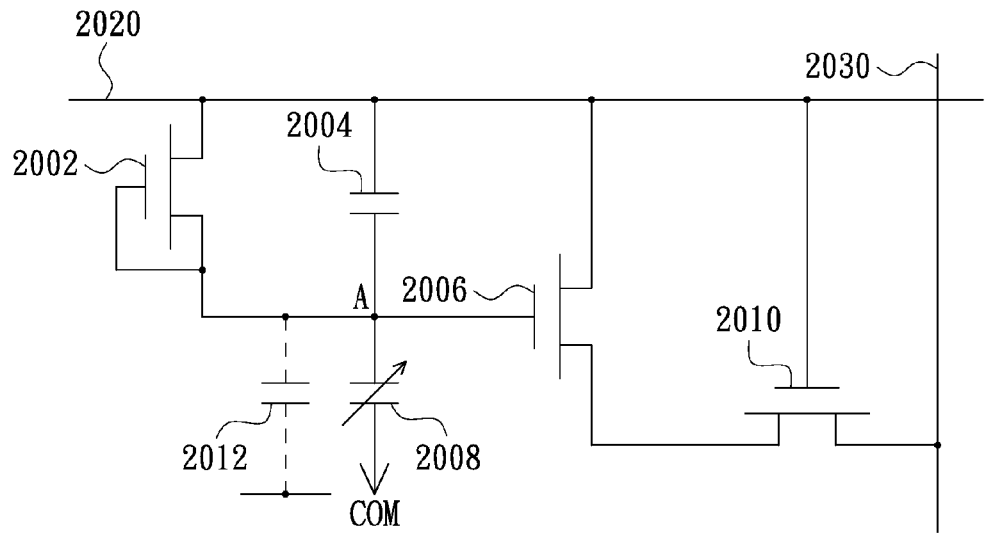
FIG. 20 is a schematic view of an equivalent circuit of a capacitance touch sensor and a coupling relation thereof in accordance with another exemplary embodiment of the present invention.

FIG. 20 is a schematic view of an equivalent circuit of a capacitance touch sensor and a coupling relation thereof in accordance with another exemplary embodiment of the present invention. Referring to FIG. 20, the capacitance touch sensor consists of a transistor 2002, a reference capacitor 2004, a transistor 2006, a touch sensing capacitor 2008 and a transistor 2010. In addition, a label 2012 represents a parasitic capacitor. The capacitance touch sensor is electrically coupled to a gate line 2020, a sensing-signal readout line 2030 and a common potential COM. In the capacitance touch sensor, the transistor 2002 is called a reset transistor, the transistor 2006 is called an amplification transistor, and the transistor 2010 is called a selection transistor. In addition, the capacitance value of the touch sensing capacitor 2008 alters with the pressing strength, and a current passing through the two source/drain terminals of the transistor 2010 is the output current.

Figure 21:
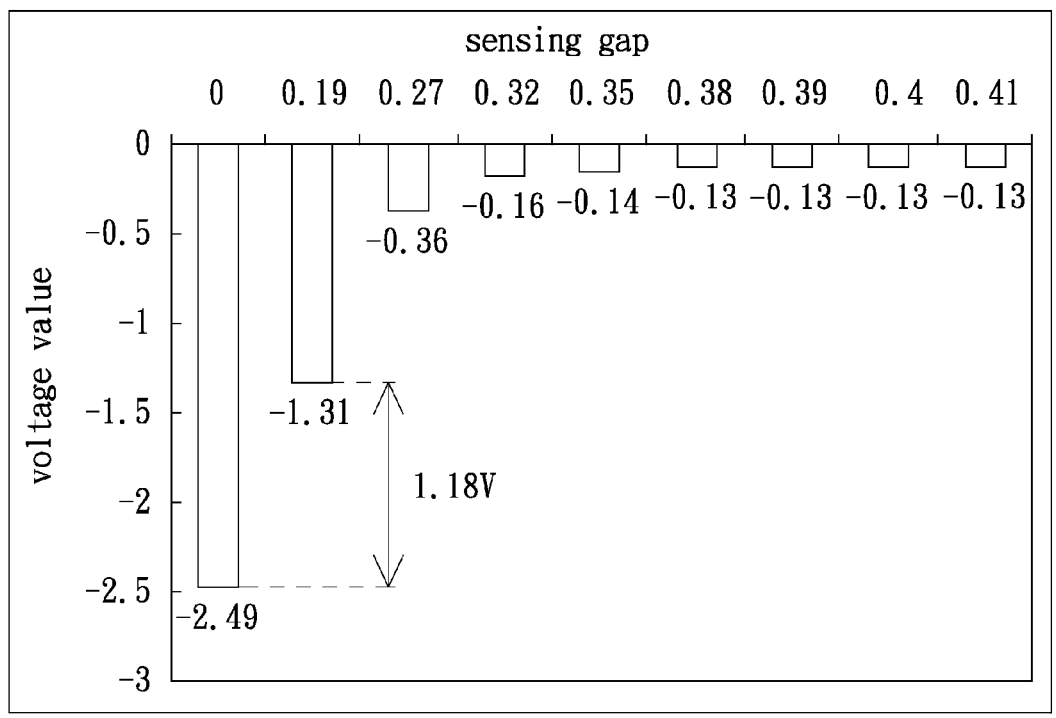
FIG. 21 is a schematic view of a linear relation of the circuit as shown in FIG. 20.

FIG. 21 is a schematic view of a linear relation of the circuit as shown in FIG. 20. In FIG. 21, the vertical axis represents the voltage value obtained by the post-processing circuit 408 performing the integration operation on the output current of the capacitance touch sensor as shown in FIG. 20, and the unit of the voltage value is V. The horizontal axis represents the sensing gap of the capacitance touch sensor (i.e., the distance between the two electrodes of the touch sensing capacitor), and the unit of the sensing gap is um.

Figure 22:
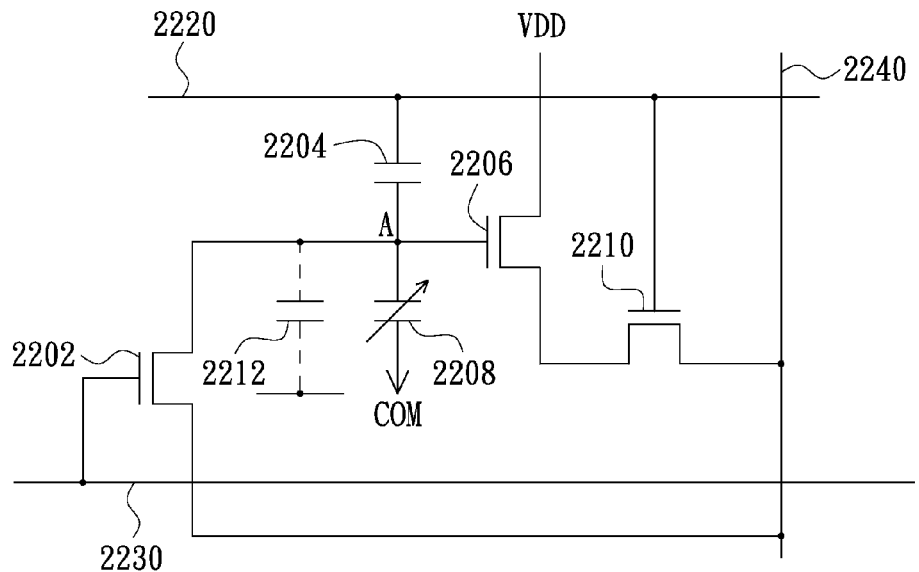
FIG. 22 is a schematic view of an equivalent circuit of a capacitance touch sensor and a coupling relation thereof in accordance with still another exemplary embodiment of the present invention.

FIG. 22 is a schematic view of an equivalent circuit of a capacitance touch sensor and a coupling relation thereof in accordance with still another exemplary embodiment of the present invention. Referring to FIG. 22, the capacitance touch sensor consists of a transistor 2202, a reference capacitor 2204, a transistor 2206, a touch sensing capacitor 2208 and a transistor 2210. In addition, a label 2212 represents a parasitic capacitor. The capacitance touch sensor is electrically coupled to a gate line 2220, a gate line 2230, a sensing-signal readout line 2240, a power voltage VDD and a common potential COM. In the capacitance touch sensor, the transistor 2202 is called a reset transistor, the transistor 2206 is called an amplification transistor, and the transistor 2210 is called a selection transistor. In addition, the capacitance value of the touch sensing capacitor 2208 alters with the pressing strength, and the current passing through the two source/drain terminals of the transistor 2210 is the output current.

Figure 23:
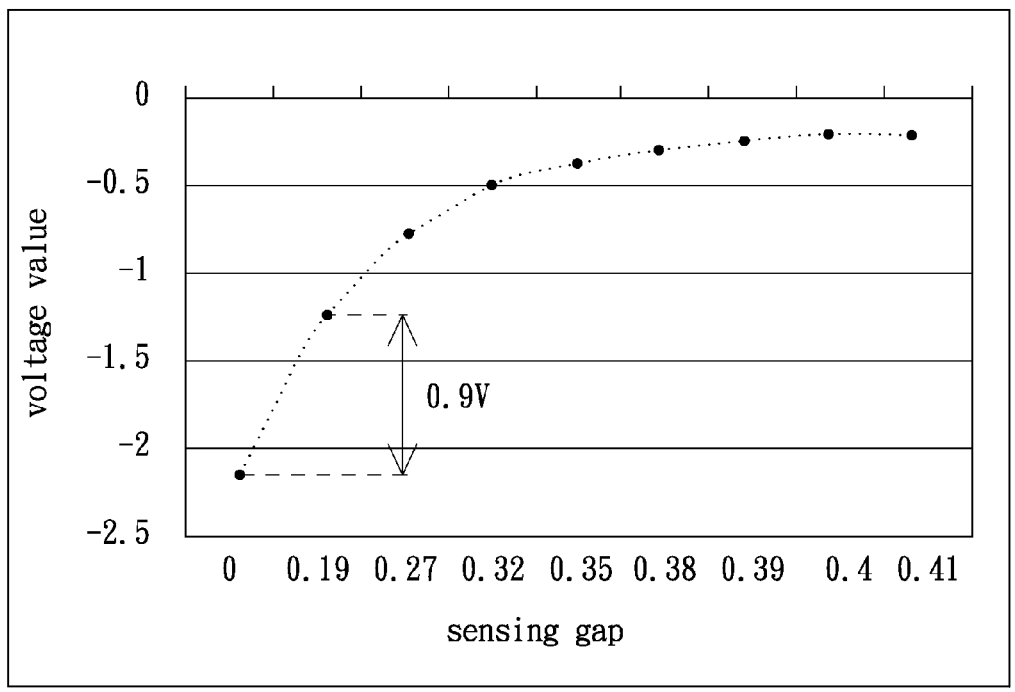
FIG. 23 is a schematic view of a linear relation of the circuit as shown in FIG. 22.

FIG. 23 is a schematic view of a linear relation of the circuit as shown in FIG. 22. In FIG. 23, the vertical axis represents the voltage value obtained by the post-processing circuit 408 performing the integration operation on the output current of the capacitance touch sensor as shown in FIG. 22, and the unit of the voltage value is V. The horizontal axis represents the sensing gap of the capacitance touch sensor (i.e., the distance between the two electrodes of the touch sensing capacitor), and the unit of the sensing gap is um.

Figure 24:
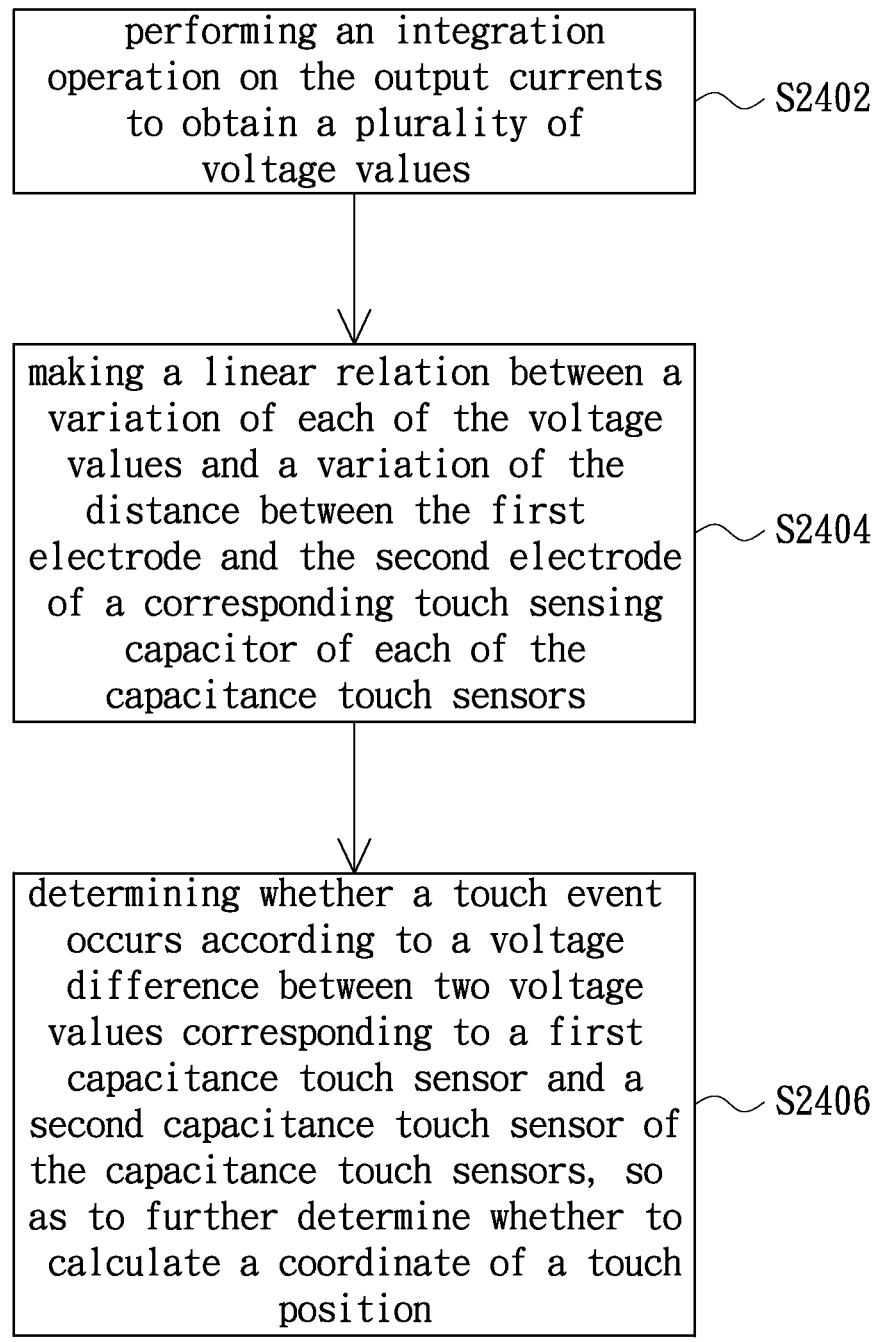
FIG. 24 is a flow chart of a touch sensing method in accordance with an exemplary embodiment of the present invention.

From the above description, persons skilled in the art can conclude a touch sensing method as shown in FIG. 24. FIG. 24 is a flow chart of the touch sensing method in accordance with an exemplary embodiment of the present invention. The touch sensing method is adapted to a touch sensing apparatus which comprises a plurality of capacitance touch sensors disposed in a LCD panel. Each of the capacitance touch sensors has a touch sensing capacitor, and each touch sensing capacitor has a first electrode and a second electrode. Each of the capacitance touch sensors determines a value of an output current according to a distance between the first electrode and the second electrode of the touch sensing capacitor thereof. The touch sensing method comprises the following steps: performing an integration operation on the output currents respectively to obtain a plurality of voltage values (as shown in step S2402); making a linear relation between a variation of each of the voltage values and a variation of the distance between the first electrode and the second electrode of a corresponding touch sensing capacitor (as shown in step S2404); and determining whether a touch event occurs according to a voltage difference between two voltage values corresponding to a first capacitance touch sensor and a second capacitance touch sensor of the capacitance touch sensors, so as to further determine whether to calculate a coordinate of a touch position (as shown in step S2406).

In addition, in a preferable exemplary embodiment, the touch sensing method may adjust a difference between a high potential and a low potential of a scanning-pulse signal received by each of the capacitance touch sensors and a voltage of the reset signal to make the linear relation between the variation of each of the voltage values and the variation of the distance between the first electrode and the second electrode of a corresponding one of the capacitance touch sensors.

It should be noted that although the above exemplary embodiments employs two adjacent capacitance touch sensors to determine whether a touch event occurs, it is understood for persons skilled in the art that two non-adjacent capacitance touch sensors may be employed to determine whether a touch event occurs.

In summary, the present invention makes the linear relation between the variation of each of the voltage values obtained by the post-processing circuit performing the integration operation on the output currents and the variation of the distance (that is the sensing gap) between the first electrode and the second electrode of a corresponding one of the touch sensing capacitors. Since there is the linear relation between the variation of the distance and the variation of the voltage value, the variation of the voltage value is uniform as long as the variation of the corresponding distance is uniform, no matter whether the sensing gap of the capacitance touch sensor fits with the design standard. This means that the variation of each of the voltage values obtained by the post-processing circuit performing the integration operation on the output currents is uniform as long as a user touches the LCD panel with the same force. Therefore, the post-processing circuit will not misjudge a touch event when it determines whether the touch event occurs according to the obtained voltage values. In other words, the touch sensing apparatus will not be affected by non-uniform sensing gaps and will not misjudge a touch event.

In addition, it can adjust the operation characters of the capacitance touch sensors to make the linear relation between the variation of the distances and the variation of the voltage values. In a preferable exemplary embodiment, it can adjust the difference between the high potential and the low potential of the scanning-pulse signal received by the capacitance touch sensors and the voltage of the reset signal to achieve the linear relation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch sensing apparatus adapted to a LCD panel, the touch sensing apparatus comprising:
   a plurality of capacitance touch sensors disposed in the LCD panel, each of the capacitance touch sensors having a touch sensing capacitor, each of the touch sensing capacitors having a first electrode and a second electrode, each of the capacitance touch sensors determining a value of an output current according to a distance between the first electrode and the second electrode of the touch sensing capacitor thereof; and a post-processing circuit electrically coupled to the capacitance touch sensors for performing an integration operation on the output currents to obtain a plurality of voltage values, the post-processing circuit further determining whether a touch event occurs according to a voltage difference between two voltage values corresponding to a first capacitance touch sensor and a second capacitance touch sensor of the capacitance touch sensors, so as to further determine whether to calculate a coordinate of a touch position;

wherein there is a linear relation between a variation of each of the voltage values and a variation of the distance between the first electrode and the second electrode of a corresponding one of the touch sensing capacitors.

2. The touch sensing apparatus according to claim 1, wherein the second electrodes of the touch sensing capacitors are all electrically coupled to a common potential, and each of the capacitance touch sensors further comprises:

a reference capacitor having a first terminal and a second terminal, the first terminal being configured for receiving a first scanning-pulse signal, and the second terminal being electrically coupled to the first electrode of the touch sensing capacitor;

a first transistor having a first gate terminal, a first source/drain terminal and a second source/drain terminal, the first source/drain terminal and the first gate terminal being configured for receiving a reset signal and a second scanning-pulse signal respectively, and the second source/drain terminal being electrically coupled to the first electrode of the touch sensing capacitor; and a second transistor having a second gate terminal, a third source/drain terminal and a fourth source/drain terminal, the third source/drain terminal and the fourth source/drain terminal being electrically coupled to a power voltage and the post-processing circuit respectively, the second gate terminal being electrically coupled to the first electrode of the touch sensing capacitor, a current passing through the third source/drain terminal and the fourth source/drain terminal being the output current.

3. The touch sensing apparatus according to claim 2, wherein a difference between a high potential and a low potential of the first scanning-pulse signal received by each of the capacitance touch sensors and a voltage of the reset signal are adjusted so that there is the linear relation between the variation of each of the voltage values and the variation of the distance between the first electrode and the second electrode of the corresponding one of the touch sensing capacitors.

4. The touch sensing apparatus according to claim 3, wherein a distance between the first capacitance touch sensor and the second capacitance touch sensor is larger than a predetermined distance, the first capacitance touch sensor is in a non-touched state, the second capacitance touch sensor is in a touched state, there is a predetermined phase difference between a pulse of the first scanning-pulse signal and a pulse of the second scanning-pulse signal which are received by the first capacitance touch sensor, and there is also the predetermined phase difference between a pulse of the first scanning-pulse signal and a pulse of the second scanning-pulse signal which are received by the second capacitance touch sensor.

5. The touch sensing apparatus according to claim 4, wherein when the post-processing circuit determines that the voltage difference between the two voltage values corresponding to the first capacitance touch sensor and the second capacitance touch sensor reaches a predetermined value, the post-processing circuit determines that the touch event occurs.

6. The touch sensing apparatus according to claim 4, wherein the distance between the first electrode and the second electrode of the touch sensing capacitor of the first capacitance touch sensor is fixed, so that the output current outputted from the first capacitance touch sensor is constant.

7. The touch sensing apparatus according to claim 6, wherein when the post-processing circuit determines that the voltage difference between the two voltage values corresponding to the first capacitance touch sensor and the second capacitance touch sensor reaches a predetermined value, the post-processing circuit determines that the touch event occurs.

8. The touch sensing apparatus according to claim 3, wherein a distance between the first capacitance touch sensor and the second capacitance touch sensor is less than a predetermined distance, the first capacitance touch sensor and the second capacitance touch sensor are both in a touched state, there is a predetermined phase difference between a pulse of the first scanning-pulse signal and a pulse of the second scanning-pulse signal which are received by the first capacitance touch sensor, and the first scanning-pulse signal and the second scanning-pulse signal received by the second capacitance touch sensor have the same pulse height and are in phase.

9. The touch sensing apparatus according to claim 8, wherein when the post-processing circuit determines that the voltage difference between the two voltage values corresponding to the first capacitance touch sensor and the second capacitance touch sensor reaches a predetermined value, the post-processing circuit determines that the touch event occurs.

10. The touch sensing apparatus according to claim 3, wherein a distance between the first capacitance touch sensor and the second capacitance touch sensor is less than a predetermined distance, the first capacitance touch sensor and the second capacitance touch sensor are both in a touched state, there is a predetermined phase difference between a pulse of the first scanning-pulse signal and a pulse of the second scanning-pulse signal which are received by the first capacitance touch sensor, and there is also the predetermined phase difference between a pulse of the first scanning-pulse signal and a pulse of the second scanning-pulse signal which are received by the second capacitance touch sensor, the pulse of the first scanning-pulse signal received by the second capacitance touch sensor and the pulse of the first scanning-pulse signal received by the first capacitance touch sensor are in anti-phase.

11. The touch sensing apparatus according to claim 10, wherein when the post-processing circuit determines that the voltage difference between the two voltage values corresponding to the first capacitance touch sensor and the second capacitance touch sensor reaches a predetermined value, the post-processing circuit determines that the touch event occurs.

12. The touch sensing apparatus according to claim 3, wherein a distance between the first capacitance touch sensor and the second capacitance touch sensor is less than a predetermined distance, the first capacitance touch sensor and the second capacitance touch sensor are both in a touched state, there is a predetermined phase difference between a pulse of the first scanning-pulse signal and a pulse of the second scanning-pulse signal which are received by the first capacitance touch sensor, and there is also the predetermined phase difference between a pulse of the first scanning-pulse signal and a pulse of the second scanning-pulse signal which are received by the second capacitance touch sensor, the power voltage electrically coupled to the third source/drain terminal of the second transistor of the first capacitance touch sensor is larger than a voltage on the fourth source/drain terminal of the second transistor of the first capacitance touch sensor, the power voltage electrically coupled to the third source/drain terminal of the second transistor of the second capacitance touch sensor is less than a voltage on the fourth source/drain terminal of the second transistor of the second capacitance touch sensor, and the post-processing circuit has an ability for processing the output currents with different flowing directions.

13. The touch sensing apparatus according to claim 12, wherein when the post-processing circuit determines that the voltage difference between the two voltage values corresponding to the first capacitance touch sensor and the second capacitance touch sensor reaches a predetermined value, the post-processing circuit determines that the touch event occurs.

14. The touch sensing apparatus according to claim 1, wherein the first electrodes are implemented by a common electrode of an upper substrate of the LCD panel.

15. The touch sensing apparatus according to claim 1, wherein the second electrodes of the touch sensing capacitors are all electrically coupled to a common potential, and each of the capacitance touch sensors further comprises:
  a reference capacitor having a first terminal and a second terminal, the first terminal being configured for receiving a scanning-pulse signal, and the second terminal being electrically coupled to the first electrode of the touch sensing capacitor;
  a first transistor having a first gate terminal, a first source/drain terminal and a second source/drain terminal, the first source/drain terminal being configured for receiving the scanning-pulse signal, and the first gate terminal being electrically coupled to the second source/drain terminal and the first electrode of the touch sensing capacitor;
  a second transistor having a second gate terminal, a third source/drain terminal and a fourth source/drain terminal, the third source/drain terminal being configured for receiving the scanning-pulse signal, and the second gate terminal being electrically coupled to the first electrode of the touch sensing capacitor; and
  a third transistor having a third gate terminal, a fifth source/drain terminal and a sixth source/drain terminal, the third gate terminal being configured for receiving the scanning-pulse signal, the fifth source/drain terminal being electrically coupled to the fourth source/drain terminal, the sixth source/drain terminal being electrically coupled to the post-processing circuit, a current passing through the fifth source/drain terminal and the sixth source/drain terminal being the output current.

16. The touch sensing apparatus according to claim 1, wherein the second electrodes of the touch sensing capacitors are all electrically coupled to a common potential, and each of the capacitance touch sensors further comprises:
  a reference capacitor having a first terminal and a second terminal, the first terminal being configured for receiving a first scanning-pulse signal, and the second terminal being electrically coupled to the first electrode of the touch sensing capacitor;
  a first transistor having a first gate terminal, a first source/drain terminal and a second source/drain terminal, the first source/drain terminal being electrically coupled to the first electrode of the touch sensing capacitor, the first gate terminal being configured for receiving a second scanning-pulse signal, and the second source/drain terminal being electrically coupled to the post-processing circuit;
  a second transistor having a second gate terminal, a third source/drain terminal and a fourth source/drain terminal, the third source/drain terminal being electrically coupled to a power voltage, and the second gate terminal being electrically coupled to the first electrode of the touch sensing capacitor; and
  a third transistor having a third gate terminal, a fifth source/drain terminal and a sixth source/drain terminal, the third gate terminal being configured for receiving the first scanning-pulse signal, the fifth source/drain terminal being electrically coupled to the fourth source/drain terminal, the sixth source/drain terminal being electrically coupled to the post-processing circuit, and a current passing through the fifth source/drain terminal and the sixth source/drain terminal being the output current.

17. The touch sensing apparatus according to claim 1, wherein the first capacitance touch sensor and the second capacitance touch sensor are adjacent.

18. A touch sensing method adapted to a touch sensing apparatus, the touch sensing apparatus comprising a plurality of capacitance touch sensors, the capacitance touch sensors being disposed in a LCD panel, each of the capacitance touch sensors having a touch sensing capacitor, each of touch sensing capacitors having a first electrode and a second electrode, each of the capacitance touch sensors being configured for determining a value of an output current according to a distance between the first electrode and the second electrode of the touch sensing capacitor thereof, the method comprising:
  performing an integration operation on the output currents to obtain a plurality of voltage values;
  making a linear relation between a variation of each of the voltage values and a variation of the distance between the first electrode and the second electrode of a corresponding touch sensing capacitor; and
  determining whether a touch event occurs according to a voltage difference between two voltage values corresponding to a first capacitance touch sensor and a second capacitance touch sensor of the capacitance touch sensors, so as to further determine whether to calculate a coordinate of a touch position.

19. The touch sensing method according to claim 18, wherein a difference between a high potential and a low potential of a scanning-pulse signal received by each of the capacitance touch sensors and a voltage of a reset signal are adjusted so that there is a linear relation between the variation of each of the voltage values and the variation of the distance between the first electrode and the second electrode of the corresponding one of the touch sensing capacitors.

20. The touch sensing method according to claim 18, wherein the first capacitance touch sensor and the second capacitance touch sensor are adjacent.

* * * * *